(12) United States Patent
Neumann et al.

(10) Patent No.: US 10,294,847 B2
(45) Date of Patent: May 21, 2019

(54) EXHAUST GAS TREATMENT DEVICE

(71) Applicant: Eberspächer Exhaust Technology GmbH & Co. KG, Neunkirchen (DE)

(72) Inventors: Felix Neumann, Aichwald (DE); Alexander Kauderer, Kuchen (DE); Simon Krammer, Winnenden (DE); Kirill Karelin, Böblingen (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 51 days.

(21) Appl. No.: 15/227,299

(22) Filed: Aug. 3, 2016

(65) Prior Publication Data
US 2017/0089249 A1 Mar. 30, 2017

(30) Foreign Application Priority Data
Sep. 25, 2015 (DE) .......... 10 2015 218 503

(51) Int. Cl.
*F01N 13/18* (2010.01)
*F01N 3/28* (2006.01)
*F01N 3/021* (2006.01)
*F01N 3/24* (2006.01)
*F01N 3/08* (2006.01)

(52) U.S. Cl.
CPC ........ *F01N 13/1844* (2013.01); *F01N 3/0211* (2013.01); *F01N 3/08* (2013.01); *F01N 3/24* (2013.01); *F01N 3/2842* (2013.01); *F01N 3/2875* (2013.01); *F01N 13/185* (2013.01); *F01N 13/1816* (2013.01); *F01N 13/1827* (2013.01); *F01N 2330/00* (2013.01); *F01N 2450/30* (2013.01); *F01N 2470/12* (2013.01); *Y02T 10/20* (2013.01)

(58) Field of Classification Search
CPC ............ F01N 13/1844; F01N 13/1816; F01N 13/1827; F01N 13/185; F01N 3/0211; F01N 3/08; F01N 3/24; F01N 3/2842; F01N 3/2875; F01N 2330/00; F01N 2450/30; F01N 2470/12; Y02T 10/20
USPC .......................................................... 60/322
See application file for complete search history.

(56) References Cited

U.S. PATENT DOCUMENTS

| 3,945,803 A | 3/1976 | Musall et al. |
| 5,470,364 A * | 11/1995 | Adiletta ................... B32B 5/26 55/484 |
| 2015/0107458 A1 | 4/2015 | Werni et al. |

FOREIGN PATENT DOCUMENTS

| DE | 22 16 772 A | 10/1973 |
| DE | 93 12 405 U1 | 10/1993 |
| DE | 101 44 613 A1 | 4/2003 |
| DE | 10 2012 207 960 B3 | 8/2013 |

(Continued)

*Primary Examiner* — Laert Dounis
*Assistant Examiner* — Kelsey L Stanek
(74) *Attorney, Agent, or Firm* — McGlew and Tuttle, P.C.

(57) ABSTRACT

An exhaust gas treatment device (1), for an exhaust system of an internal combustion engine, is equipped with a housing (2). At least one mounting pipe (3), which contains a mounting space (4), is arranged within the housing. At least one cartridge (5) is arranged replaceably in the mounting space (4) and has a cartridge pipe (6) as well as at least one exhaust gas treatment element (7) arranged in the cartridge pipe (6). The cartridge pipe (6) is supported axially under axial prestress at an annular step (9) at least on an axial front side (31) via at least one spring element (27).

15 Claims, 3 Drawing Sheets (56) References Cited

FOREIGN PATENT DOCUMENTS

| EP | 1 298 289 | A1 | | 4/2003 | | |
| EP | 1298289 | A1 | * | 4/2003 | ............... | F01N 1/10 |

* cited by examiner

EXHAUST GAS TREATMENT DEVICE

CROSS REFERENCE TO RELATED APPLICATIONS

This application claims the benefit of priority under 35 U.S.C. § 119 of German Application 10 2015 218 503.6 filed Sep. 25, 2015 the entire contents of which are incorporated herein by reference.

FIELD OF THE INVENTION

The present invention pertains to an exhaust gas treatment device for an exhaust system of an internal combustion engine, which may be arranged, for example, in a motor vehicle.

BACKGROUND OF THE INVENTION

Exhaust systems for internal combustion engines are known to have mufflers and exhaust gas treatment devices, for example, catalytic converters and particle filters. An exhaust gas treatment device used for this purpose may be specialized for a single exhaust gas treatment function. Combined devices are likewise known, in which at least two different functions are implemented, for example, a particle filter in combination with a catalytic converter, and a muffling effect may additionally be integrated as well. Provisions may be made especially in case of more complex exhaust gas treatment devices, which contain a particle filter element, for the particle filter element to be replaced at least once during the service life of the exhaust system. It is necessary for this to arrange the particular particle filter element replaceably in the exhaust gas treatment device. This correspondingly also applies, in principle, to other exhaust gas treatment elements, such as SCR catalytic converters, oxidation-type catalytic converters and other catalytic converters.

For this purpose, an exhaust gas treatment device may have a housing, in which at least one mounting pipe is arranged, which contains a mounting space. Further, the exhaust gas treatment device may have at least one cartridge, which is arranged replaceably in the mounting space and which has a cartridge pipe as well as at least one exhaust gas treatment element arranged in the cartridge pipe. To replace the exhaust gas treatment element, the entire cartridge can simply be pulled out of the mounting pipe, with the housing opened, and replaced with a new cartridge, which is then pushed into the mounting pipe. The use of such cartridges simplifies the replacement of the particular exhaust gas treatment element, because especially the mounting of the particular exhaust gas treatment element within the cartridge pipe can be embodied within the cartridge in a conventional manner, for example, by means of a radially pressed mounting mat. In particular, a conventional canning of the exhaust gas treatment element, mounting mat and cartridge pipe can thus be carried out in order to manufacture such a cartridge.

The circumstance that a bypass flow, which bypasses an exhaust gas flow path routed through the particular exhaust gas treatment element and is intended for the exhaust gas purification function, will develop radially between the cartridge pipe and the mounting pipe during the operation of the exhaust gas treatment device is problematic in such exhaust gas treatment devices. On the one hand, the efficiency of the exhaust gas purification effect is reduced in this manner. On the other hand, contaminants, which make it difficult to remove the cartridge from the mounting space in case of maintenance, may be deposited as a result in an annular space formed radially between the cartridge pipe and the mounting pipe.

SUMMARY OF THE INVENTION

An object of the present invention is to provide an improved embodiment for an exhaust gas treatment device, which embodiment is characterized especially by an improved replaceability of the cartridge. In particular, said bypass flow is sought to be avoided for this.

According to the invention, an exhaust gas treatment device is provided for an exhaust system of an internal combustion engine. The exhaust gas treatment device comprises a housing, at least one mounting pipe arranged in the housing, the least one mounting pipe containing a mounting space and at least one cartridge arranged replaceably in the mounting space. The at least one cartridge comprises a cartridge pipe and at least one exhaust gas treatment element arranged in the cartridge pipe. A spring arrangement is provided comprising at least one spring. The cartridge pipe is axially supported at an annular step under axial prestress, at least on an axial front side, via the spring arrangement.

The present invention is based on the general idea of supporting the cartridge axially under an axial prestress at an annular step that is stationary in relation to the mounting space. This axial prestress may be used to reduce the forces necessary for extracting the cartridge from the mounting space in case of maintenance. At least one spring element is used according to the present invention to generate such a prestress. The spring element in question is preferably arranged such that the axial prestress is oriented in an extraction direction of the cartridge, i.e., against an insertion direction, in which the cartridge is inserted into the mounting pipe.

This is achieved, in general, by the cartridge pipe being supported axially at an annular step under axial prestress via at least one spring element at least on an axial front side. This annular step is arranged in the housing in a fixed manner. This annular step is preferably permanently connected to the mounting pipe. In particular, the annular step may be attached to the mounting pipe as a separate component, e.g., by soldering or welding, or it may be made integrally with the mounting pipe.

It is clear that a plurality of exhaust gas treatment elements may also be arranged in the cartridge pipe. However, the accommodation of a single, especially monolithic, preferably ceramic exhaust gas treatment element is preferred. The exhaust gas treatment element being held in the cartridge is preferably a particle filter element. It may, however, also be, in principle, a catalytic converter element, e.g., an oxidation-type catalytic converter or an SCR catalytic converter. A particle filter element with a catalytically active coating may also be provided. Further different exhaust gas treatment elements may be arranged, e.g., a catalytic converter element and, downstream therefrom, a particle filter element, one after another in the cartridge pipe. If the exhaust gas treatment element is a particle filter element, the cartridge may also be called a particle filter cartridge. If the exhaust gas treatment element is, by contrast, a catalytic converter element, the cartridge may also be called a catalytic converter cartridge.

Especially advantageous is an embodiment in which the spring element is configured as a spring element extending annularly. The prestress can be applied in a uniformly distributed manner in the circumferential direction to the cartridge due to this configuration. Furthermore, a single ring-shaped spring element is sufficient, in principle, to achieve the desired prestress. However, this does not rule out embodiments in which a plurality of spring elements are used. Such a ring-shaped spring element exerts, in addition, a certain sealing effect in case of a corresponding configuration and arrangement. Thus, the use of a ring-shaped spring elements extending annularly in a closed form can be used, in addition, to reduce or prevent a bypass flow, which bypasses the exhaust gas flow path routed through the particle filter element.

Corresponding to an especially advantageous variant, the spring element may be arranged such that it seals said exhaust gas flow path routed through the particle filter element against the aforementioned annular space, which is formed radially between the cartridge pipe and the mounting pipe. The undesired bypass flow can be significantly reduced and even prevented completely in the ideal case by the sealing effect of the spring element. Deposits or contamination in the annular space are also reduced due to the reduced bypass flow or the elimination of the bypass flow, which likewise contribute to a facilitation of the cartridge replacement. Independently herefrom, the sealing effect achieved leads to improved efficiency of the particle filter element or of the exhaust gas treatment device regarding the particle filter function.

According to an advantageous variant, the spring element may be in contact with the cartridge pipe such that it extends annularly in a closed form and/or with the annular step such that it extends annularly in a closed form. A linear contacting or contact of the spring element with the cartridge pipe and/or with the annular step is especially advantageous here. Due to the linear and prestressed contact, an efficient sealing effect is achieved between the spring element and the annular step, on the one hand, and/or between the spring element and the cartridge pipe, on the other hand. The spring element can thus efficiently seal the annular space against the exhaust gas flow path. Such a linear contacting can be achieved, for example, by a convexly arched section on the spring element in the area of the contacting or by a bead-like elevation on the spring element in the area of the contacting.

In another embodiment, the spring element may have at least one guide contour, which projects radially forward and is supported radially at the mounting pipe. This leads to a centering of the cartridge pipe in the mounting pipe in the area of the spring element. The guide contour may be configured as an annularly extending contour or formed by a plurality of local guide contour elements located at spaced locations from one another in the circumferential direction. The guide contour is preferably made integrally with the spring element. Furthermore, the guide contour may be arranged in an end section of the cartridge pipe, which said end section has the front side of the cartridge pipe. The integrated variant with closed, annularly extending guide contour is preferred, because the guide contour improves, in addition, the sealing effect in this case.

Furthermore, the spring element may have, axially next to the guide contour, at least one radial support contour, which is radially supported at the cartridge pipe. This support contour may also preferably be formed integrally on the spring element. In addition or as an alternative, this radial support contour may be configured as an annularly extending support contour and have specially a linear contact with the cartridge pipe. Further, the support contour is preferably supported on the cartridge pipe on a side of the guide contour facing away from the front side of the cartridge pipe. Such a linear contact can also be embodied here, for example, by a convexly arched section on the spring element in the area of the contacting or by a bead-like elevation on the spring element in the area of the contacting.

The guide contour may especially advantageously be arranged radially between the cartridge pipe and the mounting pipe, as a result of which the aforementioned annular space is used to accommodate the guide contour or to achieve the centering function. As an alternative, the guide contour may be arranged axially between an axial front side of the cartridge pipe and the annular step. As a result, a greater path of adjustment is available for the radial centering of the cartridge pipe within the mounting pipe, which simplifies the centering even in case of greater manufacturing tolerances.

In another advantageous embodiment, the spring element may have at least one clamping area, which extends around a front side of the cartridge pipe and fixes the spring element on the cartridge pipe by clamping. The fixation of the spring element on the cartridge pipe causes the spring element to be also extracted from the mounting space at the same time when extracting the cartridge. In particular, the spring element can thus be replaced simultaneously with the cartridge in case of maintenance. The spring element is preferably preassembled for this on the particular cartridge, so that it quasi forms a part of the cartridge.

The clamping area may be configured, for example, as a pocket, into which an end section of the cartridge pipe having the front side is axially inserted. This leads to an especially efficient radial clamping of the end section in the clamping area.

The clamping area and the pocket may preferably have an annularly extending configuration. The camping area or the pocket may preferably be formed integrally on the spring element.

In another embodiment, the spring element may have at least one clipping area, into which an inwardly bent collar of the cartridge pipe is clipped axially. Fixation of the spring element on the cartridge pipe is implemented here as well in order to enable the filter element to be extracted from the mounting space simultaneously with the rest of the cartridge in case of maintenance. A predetermined relative position is also established between the spring element and the cartridge pipe by the fixation of the spring element at the cartridge pipe. The clipping area may preferably be configured as an annularly extending area here as well. In addition or as an alternative, the clipping area may be formed integrally on the spring element. The term "inward" pertains to the radial direction; in other words, the collar points radially inwardly. The collar is preferably bent by 90° in relation to the cartridge pipe. However, other angles, which are greater or smaller than 90° may also be employed for the bend of the collar.

According to a variant, the clipping area may have a holding area, which extends around an inner edge of the collar. Efficient positive-locking fixation is achieved hereby in an especially simple manner in the axial direction between the spring element and the cartridge pipe. For example, the holding area may be S-shaped in a longitudinal section of the spring element. Such a longitudinal section is located in one plane, in which a central longitudinal axis of the cartridge is located as well. Here as well, the holding area is preferably formed integrally on the clipping area or the integral spring element.

According to another advantageous variant, the clipping area may have at least one locking contour, which interacts with an opposing locking contour, which is formed on the collar and is complementary to the locking contour formed on the collar, for fixing or positioning the collar at the clipping area. For example, the locking contour is an axially projecting projection. The opposing locking contour, which is complementary hereto, is a corresponding depression in this case. The locking contour may likewise be a depression, while the opposing locking contour is formed by a projection that is complimentary thereto. Said locking contour may have a punctiform configuration, i.e., have a plurality of locking contour elements distributed in the circumferential direction. However, a ring-shaped configuration of the locking contour is preferred, whereby the aforementioned sealing effect can be improved. An integral mode of construction is also preferred here, so that the locking contour is formed integrally on the clipping area or on the spring element.

In another advantageous embodiment, the spring element may have at least one axially spring-loaded spring area, which extends axially between the front side and the wall. The spring area is preferably formed integrally on the spring element here as well. The spring element can elastically compensate thermal expansion effects, which lead to different changes in length on the mounting pipe and on the cartridge pipe, by means of this axially spring-loaded spring area without excessive stresses developing in the process. At the same time, a sealing effect possibly achieved with the spring element can be guaranteed over the entire temperature range to be expected of the exhaust gas treatment device, because the spring element can elastically follow the possibly occurring relative motions and is always in contact with the annular step and with the cartridge pipe in a prestressed manner.

In an advantageous variant, the spring area may have a corrugation or corrugated structure in the longitudinal section of the spring element. Here as well, the longitudinal section is located in a section plane in which the central longitudinal axis of the cartridge is also located. Due to such a corrugated structure, the spring element is axially spring-loaded over a comparatively wide range of adjustment. The spring element is formed as a result like a corrugated bellows in the spring element. The spring element is preferably made of a metal, preferably spring steel.

In another advantageous embodiment, the spring element may have a support area, with which the spring element is axially supported at the annular step and which has at least one locking contour, which interacts with an opposing locking contour complementary to the locking contour formed at the annular step for radially fixing or radially positioning the spring element. A desired relative position between the spring element and the annular step, especially a radial centering of the spring element relative to the annular step, can be achieved here as well. Further, the locking contour may be formed, for example, by an axially projecting projection in this case as well, while the opposing locking contour complementary thereto is formed by a corresponding axial depression. The reverse case is possible here as well, in which the locking contour is formed by an axial depression, while the opposing locking contour now has an axial projection. The locking contour is preferably configured such that it extends fully annularly in the circumferential direction. The locking contour may have a punctiform depression in the circumferential direction, for example, in the form of separate locking contour elements. Furthermore, an integration of the locking contour in the spring element is preferred here as well.

In another embodiment, the annular step may be arranged in a fixed manner on the mounting pipe axially opposite an insertion opening for inserting the cartridge into the mounting space. For example, the annular step may be formed integrally on the mounting pipe. It may likewise be welded to it or soldered to it. Further, the insertion opening of the mounting pipe is arranged within the housing and at an axially spaced location as well as axially flush with a housing opening, through which the cartridge can be inserted into the insertion opening. The housing opening can now preferably be closed with a closing device, which can be removed for replacing the cartridge, and which is axially supported at the cartridge or at the cartridge pipe and wherein the cartridge or the cartridge pipe pushes into the mounting space against the prestress of the spring element. It is achieved through this mode of construction, on the one hand, that the cartridge can be integrated in the exhaust gas flow path, which extends within the housing, in an especially simple manner. On the other hand, it is achieved in case of maintenance that when the closing device is removed, the force opposing the spring element is abolished, so that the spring element can now push the cartridge out of the mounting space, as a result of which the extraction of the cartridge from the mounting pipe is facilitated.

In an especially advantageous variant, the aforementioned closing device may have a cover for closing the housing opening as well as a support ring, which is axially supported at the cartridge or at the cartridge pipe and through which exhaust gas can flow radially. For example, a peripheral edge of the support ring may be perforated for this. The support ring may be supported at the cartridge or at the cartridge pipe via a plurality of axial webs distributed in the circumferential direction, so that there is sufficient free space, through which exhaust gas can flow, between adjacent webs in the circumferential direction.

A cartridge according to the present invention thus comprises a cartridge pipe for replaceably inserting the cartridge into a mounting pipe of the exhaust gas treatment device and at least one exhaust gas treatment element arranged in the cartridge pipe. The cartridge may preferably have, in addition, at least one spring element on an axial front side of the cartridge pipe, which is provided for axially supporting the cartridge pipe under axial prestress at an annular step of the exhaust gas treatment device when the cartridge is inserted into the mounting pipe. In addition or as an alternative, an axial front side of the cartridge pipe may have an inwardly bent collar, at which at least one spring element can be supported under axial prestress when the cartridge is inserted into the mounting pipe.

Further important features and advantages of the present invention appear from the subclaims, from the drawings and from the corresponding description of the figures on the basis of the drawings.

It is obvious that the above-mentioned features, which will also be explained below, may be used not only in the particular combination shown but in other combinations or alone as well without going beyond the scope of the present invention.

Preferred exemplary embodiments of the present invention are shown in the drawings and will be explained in more detail in the following description, where identical reference numbers designate identical or similar or functionally identical components.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
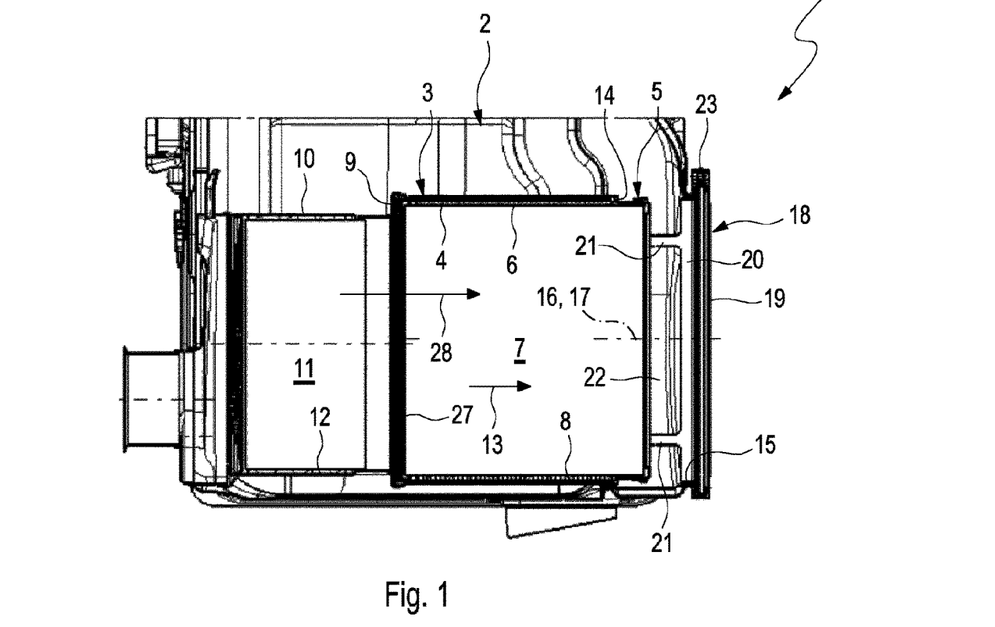
FIG. 1 is a longitudinal sectional view of an exhaust gas treatment device in the area of a cartridge.
Figure 2:
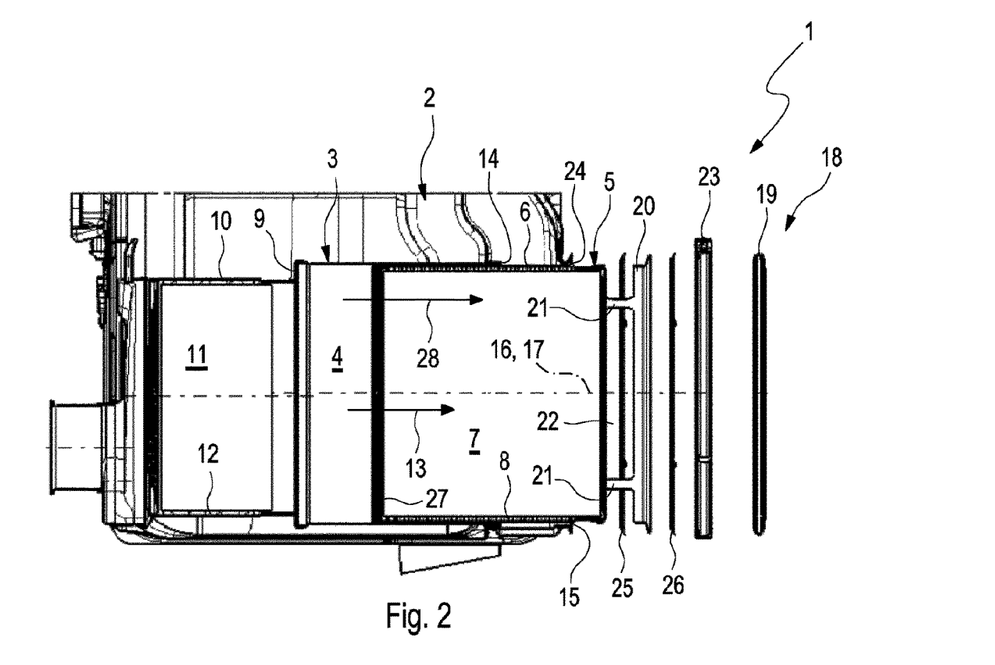
FIG. 2 is a longitudinal exploded sectional view of the device of FIG. 1, in the area of the cartridge.

Corresponding to FIGS. 1 and 2, an exhaust gas treatment device 1, which is suitable for use in an exhaust system of an internal combustion engine, preferably of a motor vehicle, which said exhaust system is not shown here, comprises a housing 2, in which at least one mounting pipe 3 is arranged, which contains a mounting space 4. The exhaust gas treatment device 1 has, in addition, at least one cartridge 5, which has a cartridge pipe 6 and at least one exhaust gas treatment element 7 arranged in the cartridge pipe 6. In the example being shown here, a particle filter element is provided as an example as an exhaust gas treatment element 7, so that the exhaust gas treatment element 7 may hereinafter also be called a particle filter element 7. In an alternative embodiment, which is not shown here, the exhaust gas treatment element 7 may also be a catalytic converter element, e.g., an oxidation-type catalytic converter element or an SCR catalytic converter element, wherein SCR denotes, in the known manner, "Selective Catalytic Reduction."

The particular particle filter element 7 is mounted and axially fixed in the cartridge pipe 6 by means of a mounting mat 8. The mounting mat 8 is regularly pressed for this radially between the particle filter element 7 and the cartridge pipe 6. Only a single particle filter element 7 is arranged in the cartridge pipe 6 in the example. The particular exhaust gas treatment element 7 is especially a one-piece, monolithic ceramic body. Two or more exhaust gas treatment elements 7 may also be arranged axially one after another in the cartridge pipe 6 in another embodiment. In respect to their exhaust gas treatment function, identical or similar exhaust gas treatment elements 7 are preferably used now, e.g., two or more particle filter elements 7. As an alternative two or more exhaust gas treatment elements 7 may be employed, which have different exhaust gas treatment functions, e.g., a particle filter element 7 and a catalytic converter element. The use of a metallic particle filter element 7, which may especially also be fixed on the cartridge pipe 6 without the use of a mounting mat 8 may be provided as another alternative.

The mounting pipe 3 is connected via an annular step 9 to a catalytic converter pipe 10, in which a catalytic converter element 11 is arranged. In the example being shown, the catalytic converter element 11 is likewise mounted and fixed axially in the catalytic converter pipe 10 by means of a mounting mat 12. The catalytic converter element 11 is preferably an oxidation-type catalytic converter. In reference to an exhaust gas flow direction 13 indicated by an arrow in FIGS. 1 and 2, the catalytic converter element 11 is preferably arranged upstream of the particle filter element 7.

The annular step 9 is located at the mounting pipe 3 axially opposite an insertion opening 14 of the mounting pipe 3. This insertion opening 14 is used to insert the cartridge 5 into the mounting space 4. The annular step 9 is arranged in a fixed manner in relation to the mounting pipe 3. In the exemplary embodiments being shown here, the annular step 9 is a separate component, which is fastened to the mounting pipe 3 in a suitable manner. The annular step 9 is also fastened to the catalytic converter pipe 10 in a suitable manner in the example. Suitable fastening means are, for example, an axial plug-type connection (shown), preferably in combination with a welded connection or soldered connection (not shown).

The insertion opening 14 is arranged within the housing 2 and axially flush as well as at an axially spaced location in relation to a housing opening 15. The axial direction is defined here by a central longitudinal axis 16 of the mounting pipe 3, which axis coincides with a central longitudinal axis 17 of the cartridge 5 in the installed state. The axial direction accordingly extends parallel to the respective central longitudinal axis 16 or 17. This housing opening 15 is dimensioned such that the cartridge 5 can be inserted into the insertion opening 14 and thus into the mounting pipe 3 or the mounting space 4 through the housing opening 15. The cartridge 5 can thus be removed from the housing 2 through the housing opening 15 in case of maintenance. In the installed state and for the operation of the exhaust gas treatment device 1, the housing opening 15 is closed with a closing device 18, which is configured such that it can be removed for replacing the cartridge 5. This closing device 18 is supported axially at the cartridge 5 and presses the cartridge 5 in the process into the mounting space 4 in the exhaust gas flow direction 13. The closing device 18 comprises here a cover 19 for closing the housing opening 15 as well as a support ring 20, which is axially supported at the cartridge pipe 6. The support ring 20 is configured such that exhaust gas can flow radially through it. This is achieved in the example by the support ring 20 being supported at the cartridge pipe 6 via a plurality of axially extending webs 21, so that a plurality of openings 22, through which exhaust gas can flow, are formed axially between the cartridge pipe 6 and the support ring 20, on the one hand, and in the circumferential direction between adjacent webs 21, on the other hand. In addition, a clamp 23, which can be removed for maintenance in an especially simple manner, is provided at the housing 2 for fixing the cover 19. The clamp 23 axially braces the cover 19 with an opening wall designated by 24 in FIG. 2 in the clamp connection embodied therewith. The support ring 20 is integrated in this clamp connection. To achieve sufficient gas tightness of the closing device 18, seals 25 and 26 shown in FIG. 2 may be used. One seal 25 is arranged axially between the opening edge 24 and the support ring 20, while the other seal 26 is arranged axially between the support ring 20 and the cover 19. The clamp 23 extends over the opening edge 24 and the cover 19 and all the components arranged axially between them, i.e., here the two seals 25, 26 and the support ring 20.

Figure 3:
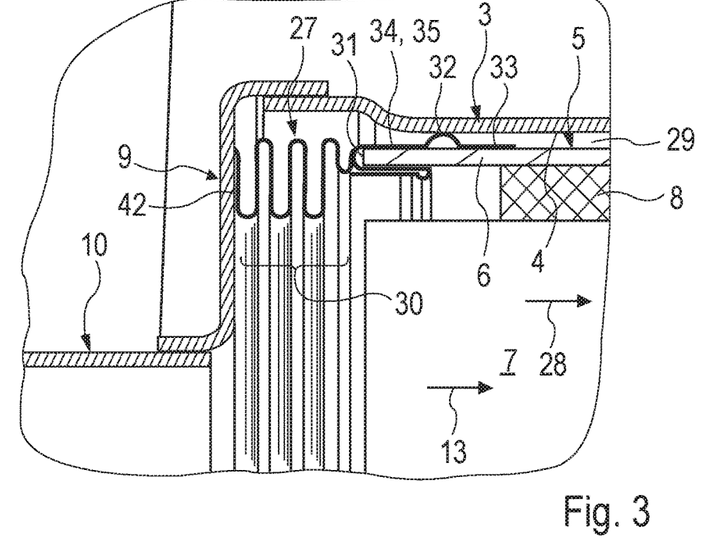
FIG. 3 is an enlarged view of detail III from FIG. 1 in the area of a spring element.
Figure 4:
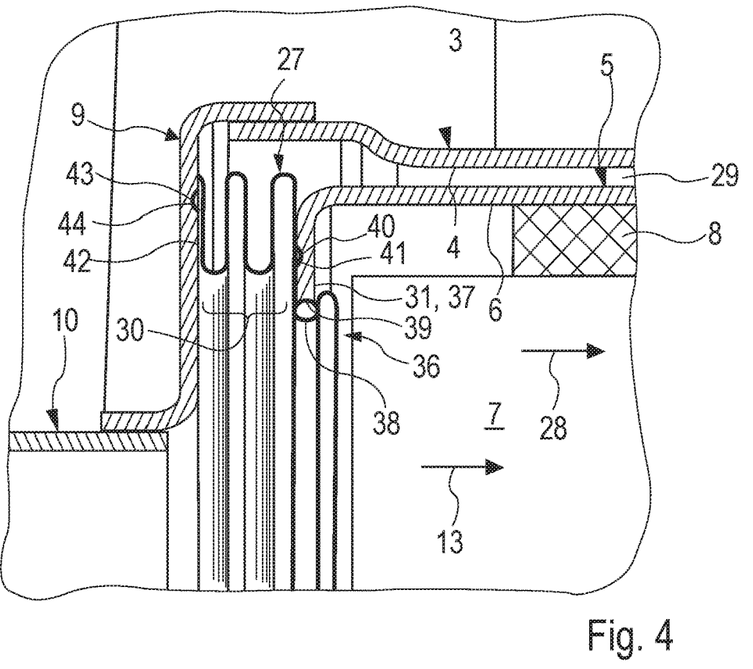
FIG. 4 is a detail view as in FIG. 3, but for another embodiment.
Figure 5:
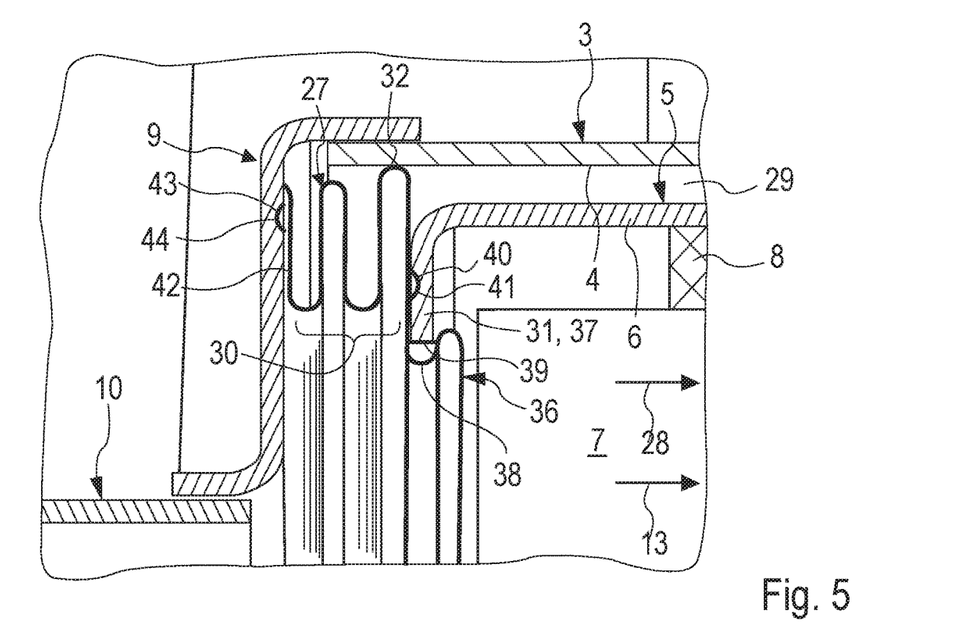
FIG. 5 is a detail view as in FIG. 3, but for another embodiment.

The exhaust gas treatment device 1 being shown here is characterized, in addition, by a spring element 27, which is shown in an enlarged form for different embodiments in FIGS. 3 through 5. The spring element 27 is supported axially at the cartridge pipe 6, on the one hand, and at the annular step 9, on the other hand. The spring element 27 is axially compressed in the installed state shown in FIG. 1, so that it generates an axial prestress, with which the cartridge 5 is ultimately supported axially at the annular step 9 via the spring element 27. As a result, the spring element 27 drives the cartridge 5 in the exhaust gas flow direction 13.

According to FIGS. 3 through 6, the spring element 27 has a ring-shaped and circumferentially closed configuration. Further, it is arranged such that it seals an exhaust gas flow path 28, which is likewise indicated by an arrow and which passes through the particle filter element 7, against an annular space 29, which is formed radially between the cartridge pipe 6 and the mounting pipe 3, The radial direction relates here to the particular central longitudinal axis 16, 17. For improved sealing effect, the spring element 27 is linearly in contact with the cartridge pipe 6, on the one hand, and is linearly in contact with the annular step 9, on the other hand.

In all embodiments shown in FIGS. 3 through 6, the spring element 27 has an axially spring-mounted spring area 30, which is located axially between a front side 31 of the cartridge pipe 6 and the annular step 9. The mode of construction being shown here is preferred, in which the spring area 30 has a corrugated structure. A plurality of radially inwardly and radially outwardly arched corrugations, which do not touch each other axially, alternate here, as a result of which the desired axial elasticity develops.

The spring element 27 is a one-part or one-piece element in all the embodiments shown here, so that all the sections, contours and areas of the spring elements 27 that can be seen here are formed integrally thereon. In addition to this preferred integral configuration, a built up embodiment may be provided as well, in which the spring element 27 is composed of at least two individual parts.

Figure 6:
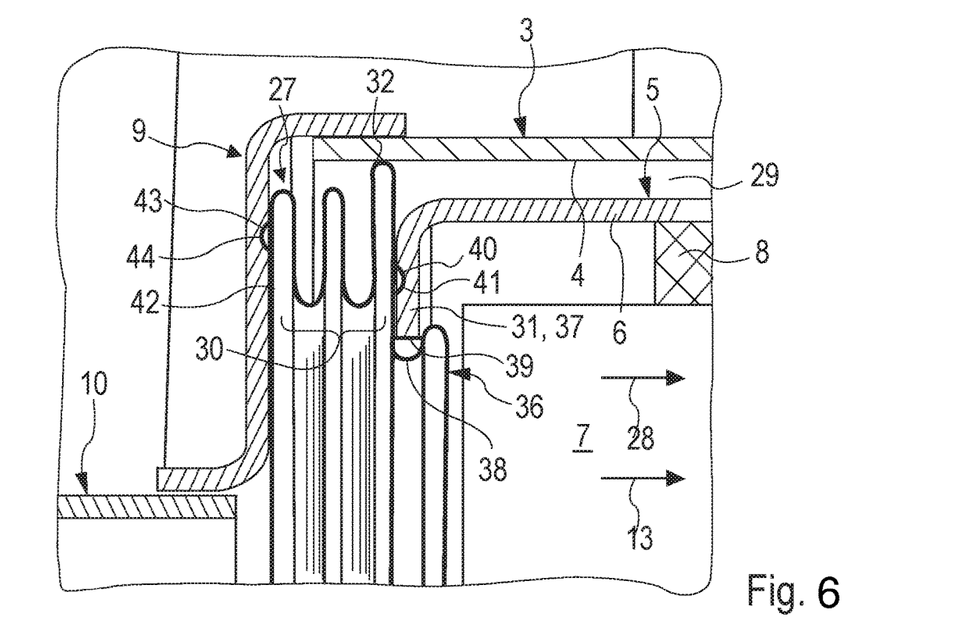
FIG. 6 is a detail view as in FIG. 3, but for another embodiment.

In the embodiments according to FIGS. 3, 5 and 6, the spring element 27 has at least one radially outwardly projecting guide contour 32, which is radially supported at the mounting pipe 3. This guide contour 32 preferably has an annularly extending configuration, as a result of which an additional sealing effect can be achieved. However, the guide contour 32 is used primarily for the radial centering of the cartridge pipe 6 in relation to the mounting pipe 3 in the mounting space 4.

In the embodiment shown in FIG. 3, the guide contour 32 is arranged radially between the cartridge pipe 6 and the mounting pipe 3. Further, provisions are made here for a support contour 33, which is radially supported at the cartridge pipe 6 radially on the outside, to adjoin the guide contour 32 on a side facing away from the spring area 30. Further, a clamping area 34, which extends around the front side 31 of the cartridge pipe 6 and brings about fixation of the spring element 27 at the cartridge pipe 6 by clamping, is formed in this embodiment at the spring element 27. In the example according to FIG. 3, the clamping area 34 is configured as a pocket 35, into which an end section of the cartridge pipe 6, which has the front side 31, is axially inserted.

By contrast, the guide contour 32 is arranged axially between the front side 31 and the annular step 9 in the embodiments according to FIGS. 5 and 6. The guide contour 32 is formed here in an especially simple manner by means of an outwardly arched corrugation of the corrugated spring area 30. The first corrugation of the corrugated structure adjoining the cartridge pipe 6 is advantageously extended for this radially to the outside to the extent that it comes radially into contact with the mounting pipe 3.

In the embodiments shown in FIGS. 4 through 6, the spring element 27 has a clipping area 36, which is clipped to the cartridge pipe 6. The cartridge pipe 6 is provided for this, at its end facing the annular step 9, with an inwardly bent collar 37, which forms the front side 31 of the cartridge pipe 6 in these embodiments. The collar 37 may be bent here inwardly to the extent that it radially overlaps at the edge the particle filter element 7. Said collar 37 is now clipped axially into the clipping area 36 of the spring element 27, as a result of which a positive-locking fixation of the spring element 27 on the cartridge pipe 6 is obtained. A holding area 38, which has an S-shaped configuration in the longitudinal section and extends around an inner edge 39 of the collar 37, is formed for this on the clipping area 36.

In the embodiments shown in FIGS. 4 through 6, the clipping area 36 has, in addition, at least one locking contour 40, which may interact especially with a complementary opposing locking contour 41 formed on the collar 37 in order to radially fix the spring element 27 on the collar 37 in the clipping area 36. The locking contour 40 is preferably configured for this as an annular closed circumferential, axially projecting projection at the spring element 27. The opposing locking contour 41 is shaped as an annularly extending axial depression complementary thereto on the cartridge pipe 6. If the opposing locking contour 41 is missing, the desired linear contact between the spring element 27 and the cartridge pipe 6 can be achieved by means of the locking contour 40, so that the locking contour 40 will now be a sealing contour 40 or linear contact contour 40 or act as such.

In the embodiments according to FIGS. 3 through 6, the spring element 27 is supported axially at the annular step 9 via a support area 42. As was mentioned, a linear support is preferred here.

In addition, at least one locking contour 43, which can preferably interact with an opposing locking contour 44, which is complementary thereto and is formed for this purpose in the annular step 9, is provided in said support area 42 in the embodiments according to FIGS. 4 through 6. In the example being shown, the locking contour 43 is formed by an axially projecting projection at the spring element 27, which projection preferably extends in a closed form in the circumferential direction. The opposing locking contour 44 is formed now by a corresponding axial depression at the annular step 9, which said depression extends circumferentially in an annularly closed form. The locking contour 43 likewise brings about here a radial fixation of the spring element 27 in the support area 42 at the annular step 9. If the opposing locking contour 44 is missing, the desired linear contact between the spring element 27 and the annular step 9 can be brought about by means of the locking contour 43, so that the locking contour 43 is a sealing contour 43 or linear contact contour 43 now or is used as such.

While specific embodiments of the invention have been shown and described in detail to illustrate the application of the principles of the invention, it will be understood that the invention may be embodied otherwise without departing from such principles.

What is claimed is:

1. An exhaust gas treatment device for an exhaust system of an internal combustion engine, the exhaust gas treatment device comprising:
   a housing;
   at least one mounting pipe arranged in the housing, the least one mounting pipe containing a mounting space;
   at least one cartridge arranged replaceably in the mounting space, the at least one cartridge comprising a cartridge pipe and at least one exhaust gas treatment element arranged in the cartridge pipe; and
   a spring arrangement comprising at least one spring element formed of metal, wherein the cartridge pipe is axially supported at an annular step under axial prestress, at least on an axial front side, via the spring arrangement, the spring element having at least one clamping area formed as a pocket, which extends around a front side of the cartridge pipe and fixes the spring element to the cartridge pipe by clamping onto opposite sides of the cartridge pipe.

2. The exhaust gas treatment device in accordance with claim 1, wherein the spring element has an annularly extending configuration.

3. The exhaust gas treatment device in accordance with claim 2, wherein the spring element has a radial configuration between the cartridge pipe and the mounting pipe and seals an exhaust gas flow path passing through the exhaust gas treatment element against an annular space.

4. The exhaust gas treatment device in accordance with claim 3, wherein the spring element is linearly in contact with the cartridge pipe or is linearly in contact with the annular step or both is linearly in contact with the cartridge pipe and is linearly in contact with the annular step.

5. The exhaust gas treatment device in accordance with claim 1, wherein the spring element has at least one radially outwardly projecting guide contour, which is radially supported at the mounting pipe.

6. The exhaust gas treatment device in accordance with claim 5, wherein:
the at least one radially outwardly projecting guide contour is arranged extending radially between the cartridge pipe and the mounting pipe; or
the at least one radially outwardly projecting guide contour is arranged extending axially between an axial front side of the cartridge pipe and the annular step.

7. The exhaust gas treatment device in accordance with claim 1, wherein the spring element comprises a support area, with which the spring element is axially supported at the annular step and which has at least one locking contour, which interacts with an opposing locking contour formed on the annular step for radially positioning the spring element at the annular step.

8. A cartridge for an exhaust gas treatment device comprising a housing and at least one mounting pipe arranged in the housing, the least one mounting pipe containing a mounting space, the cartridge comprising:
a cartridge pipe for replaceably inserting the cartridge into the mounting pipe of the exhaust gas treatment device;
at least one exhaust gas treatment element arranged in the cartridge pipe; and
at least one spring element on an axial front side of the cartridge pipe for axially supporting the cartridge pipe under axial prestress at an annular step of the exhaust gas treatment device when the cartridge is inserted into the mounting pipe, said spring element being formed of metal, the spring element having an annularly extending configuration, the spring element having at least one clamping area formed as a pocket, which extends around a front side of the cartridge pipe and fixes the spring element to the cartridge pipe by clamping onto opposite sides of the cartridge pipe.

9. The cartridge in accordance with claim 8, wherein the spring element has a radial configuration between the cartridge pipe and the mounting pipe and seals an exhaust gas flow path passing through the exhaust gas treatment element against an annular space, wherein the spring element is in contact with the cartridge pipe or is in contact with the annular step or both is in contact with the cartridge pipe and is in contact with the annular step.

10. The cartridge in accordance with claim 8, wherein:
the spring element has at least one radially outwardly projecting guide contour, which is radially supported at the mounting pipe; and
the at least one radially outwardly projecting guide contour is arranged extending radially between the cartridge pipe and the mounting pipe; or
the at least one radially outwardly projecting guide contour is arranged extending axially between an axial front side of the cartridge pipe and the annular step.

11. An exhaust gas treatment device for an exhaust system of an internal combustion engine, the exhaust gas treatment device comprising:
a housing;
at least one mounting pipe arranged in the housing, the least one mounting pipe containing a mounting space;
at least one cartridge arranged replaceably in the mounting space, the at least one cartridge comprising a cartridge pipe and at least one exhaust gas treatment element arranged in the cartridge pipe; and
a spring arrangement comprising at least one spring element formed of metal, wherein the cartridge pipe is axially supported at an annular step under axial prestress, at least on an axial front side, via the spring arrangement, the spring element comprising at least one axially spring-loaded spring area, which extends axially between a front side of the cartridge pipe and the annular step, the spring area having a corrugated structure in its longitudinal section.

12. The exhaust gas treatment device in accordance with claim 11, wherein:
the spring element comprises at least one clipping area, into which an inwardly bent collar of the cartridge pipe is clipped axially; and
the clipping area comprises a holding area, which extends around an inner edge of the collar.

13. The exhaust gas treatment device in accordance with claim 12, wherein the clipping area has at least one locking contour, which interacts with an opposing locking contour formed on the collar for positioning the collar at the clipping area.

14. An exhaust gas treatment device for an exhaust system of an internal combustion engine, the exhaust gas treatment device comprising:
a housing;
at least one mounting pipe arranged in the housing, the least one mounting pipe containing a mounting space;
at least one cartridge arranged replaceably in the mounting space, the at least one cartridge comprising a cartridge pipe and at least one exhaust gas treatment element arranged in the cartridge pipe; and
a spring arrangement comprising at least one spring element formed of metal, wherein the cartridge pipe is axially supported at an annular step under axial prestress, at least on an axial front side, via the spring arrangement;
a closing device which can be removed for replacing the cartridge;
the annular step being arranged fixed at the mounting pipe axially opposite an insertion opening for inserting the cartridge into the mounting space;
the insertion opening being arranged within the housing and axially flush with a housing opening, through which the cartridge can be inserted into the insertion opening; and
the housing opening being closed with the closing device, which is axially supported at the cartridge and pushes the cartridge into the mounting space against the prestress of the spring element;

the closing device having a cover for closing the housing opening and a support ring, which is axially supported at the cartridge and wherein exhaust gas can flow radially therethrough.

15. A cartridge for an exhaust gas treatment device comprising a housing and at least one mounting pipe arranged in the housing, the least one mounting pipe containing a mounting space, the cartridge comprising:

a cartridge pipe for replaceably inserting the cartridge into the mounting pipe of the exhaust gas treatment device;

at least one exhaust gas treatment element arranged in the cartridge pipe; and at least one spring element on an axial front side of the cartridge pipe for axially supporting the cartridge pipe under axial prestress at an annular step of the exhaust gas treatment device when the cartridge is inserted into the mounting pipe, said spring element being formed of metal, the spring element having an annularly extending configuration, the spring element comprising at least one clipping area, into which an inwardly bent collar of the cartridge pipe is clipped axially;

the clipping area comprises a holding area, which extends around an inner edge of the collar; and the clipping area has at least one locking contour, which interacts with an opposing locking contour formed on the collar for positioning the collar at the clipping area.

* * * * *